United States Patent

Bryant et al.

[15] 3,695,326

[45] Oct. 3, 1972

[54] TIRE FABRIC

[72] Inventors: Michael I. Bryant, High Point; Charles E. Jones, Greensboro, both of N.C.

[73] Assignee: Burlington Industries, Inc., Greensboro, N.C.

[22] Filed: Jan. 12, 1971

[21] Appl. No.: 105,969

Related U.S. Application Data

[63] Continuation-in-part of Ser. No. 29,302, April 16, 1970.

[52] U.S. Cl............152/358, 117/76 T, 117/126 GB, 161/89, 161/91, 161/93, 161/150, 161/157
[51] Int. Cl................................................B60c 9/00
[58] Field of Search......161/78, 89, 91, 93, 146, 148, 161/150, 202, 157; 117/126 GB, 76 T; 260/839; 57/140 C, 140 G; 152/358

[56] References Cited

UNITED STATES PATENTS

| | | | |
|---|---|---|---|
| 3,367,793 | 2/1968 | Atwell | 117/126 GB |
| 2,266,631 | 12/1941 | Francis | 161/91 |
| 3,266,970 | 8/1966 | Paul | 260/839 |
| 2,525,476 | 10/1950 | Chase et al. | 117/139.5 |
| 2,939,200 | 6/1960 | Ewing et al. | 161/55 |

*Primary Examiner*—Robert F. Burnett
*Assistant Examiner*—James J. Bell
*Attorney*—Cushman, Darby & Cushman

[57] ABSTRACT

A tire fabric comprising glass warp and filling yarns, the warp and filling yarns being bonded together at cross-over points by a thermoplastic resinous bond which essentially welds the cross-over points whereby slipping or sliding movement between the warp and filling yarns is precluded, the warp and filling yarns, including the thermoplastic bond being treated with a tie coat composition for bonding to tire rubber, the tie coat composition comprising a synthetic rubber latex and resorcinol-formaldehyde reaction product.

8 Claims, No Drawings

TIRE FABRIC

This application is a continuation-in-part of Ser. No. 29,302, filed Apr. 16, 1970.

The present invention relates to a woven glass fabric which is particularly suitable for use in the manufacture of tires, e.g., belting fabric, carcass plys and the like.

Glass fabrics have had limited use in tire fabrication for a number of reasons, e.g., their high loss of tensile strength on flexing, generally low resistance to damage when abraded and the lack of satisfactory means for effectively bonding the fabric to natural and synthetic tire rubbers. Another difficulty with woven glass tire fabrics is that there is a tendency for the warp yarns to slide along the fill yarns and this necessarily makes the fabric unstable during handling or processing. Tire fabrics are usually quite loosely woven and in wet processing fabrics made from glass, the warp ends tend to bunch together and thus give a product which is undesirable for use.

The principle object of the present invention is to provide a woven glass tire fabric which is free from the above noted difficulties. Other objects will also be hereinafter apparent.

Broadly stated, the glass tire fabric of the invention is one comprising glass warp and filling yarns, the warp and filling yarns being bonded together at cross-over points by a thermoplastic resinous bond which essentially welds the cross-over points whereby slipping or sliding movement between the warp and filling yarns is precluded, the warp and filling yarns, including the thermoplastic bond, being treated with a tie coat composition for bonding to tire rubber, the tie coat composition comprising a synthetic rubber latex and resorcinol-formaldehyde reaction product (hereinafter called for convenience the "RFL" tie coat).

The success of the invention is dependent on several features, e.g., the use of the thermoplastic bond, at points where the filling and warp ends intersect, separate and distinct from the RFL tie coat. It is essential for present purposes to separately and initially bond the ends at their cross-over points before the RFL tie coat is applied. Application of the tie coat only, in lieu of the thermoplastic bonding agent included therein, or use of the thermoplastic bonding means by itself, will not give a product having the properties of the fabric of the invention.

Another important aspect of the invention is the method by which the coated fabric is made. This method comprises weaving the fabric with glass warp and fill yarns, the fill yarns only being either coated with a thermoplastic material or plied with a thermoplastic yarn, fusing the thermoplastic material, preferably while the fabric is on the loom, whereby the fused material essentially welds the cross-over points between the warp and filling yarns, allowing the fused material to solidify whereby the warp and filling yarns are rigidly bonded together, then impregnating the fabric with the RFL tie coat, drying and curing. The resulting product may then be bonded to conventional rubber tire stock in the usual manner.

An important feature of the above method is the use of filling yarn which is coated or plied with the thermoplastic bonding material. There are several advantages in applying the thermoplastic bond in this way rather than, for example, by means of the warp yarn. As noted earlier herein, tire fabric is generally loosely woven and there are normally considerably less fill yarns than warp ends. Thus, all of the fill yarns can be appropriately modified with the thermoplastic bonding material and woven in the usual way without the need for special yarn feeding means. In contrast, if the thermoplastic bond is applied by means of warp yarns (e.g., by coating or plying the same), there is no need to, or advantage in, having all of the warp yarns so modified and, in the circumstances, special feed means are needed to feed in the bonding warp in addition to the conventional warp beam or creel supply for the normal warp.

Any thermoplastic coating material or yarn which melts before burning at temperatures up to, for example, 450°–500° F., may be used for present purposes. This includes, for example, nylon, polyester, rayon, polypropylene, acrylic and vinyl resins (e.g., polyvinyl chloride or vinyl chloride/vinyl acetate copolymers) in the form of filaments, yarns or coatings. Thermoplastic filaments and/or yarns used herein may be of any size or denier and the coating material may be applied at any thickness provided there is sufficient thermoplastic available to effect the desired bond after fusing and solidifying. The thermoplastic coating may be applied to the glass yarn by, for example, drawing the yarn through a solution of the thermoplastic material followed by solvent removal. When a plied yarn is used, the glass yarn may be plied with the thermoplastic filament or yarn in any convenient way with sufficient ply turns to insure an adequate bond between the warp and fill yarns on melting and solidifying of the thermoplastic.

Various RFL or resorcinol-formaldehyde/latex compositions may be used as the tie coat herein. This composition may be more specifically described as an aqueous emulsion or dispersion of a partially condensed resorcinol-formaldehyde reaction product and a synthetic rubber latex, e.g., a styrene-butadiene latex. A particularly useful and effective RFL composition for use herein is described in Ser. No. 29,302 and comprises a synthetic rubber latex, a methylene donor and a partially reacted resorcinol-formaldehyde resin (referred to herein as "resole" for convenience). While the proportions of these components can be widely varied, they are usually employed in the following weight percentages (dry basis):

| | |
|---|---|
| latex solids | 10 – 90% |
| methylene donor | 1 – 6% |
| resole | 5 – 20% |
| Total: | 100 % |

The latex, as noted above, should be a styrene-butadiene latex and preferably at least a portion thereof (i.e., at least 10 percent up to 100 percent of the latex solids) is a vinylpyridine-butadienestyrene terpolymer. A vinylpyridine-butadiene-styrene latex suitable for use herein is available as "Gentac" (General Tire). Other equivalent terpolymers for use herein are available as Hycar 2518 (Goodrich), Pyratex B (Naugatuck), Pliolite VP–100 (Goodyear) and Butaprene PL–29 (Firestone Plastics). These terpolymers may comprise, in parts by weight, from 50 to 95 parts butadiene, 5 to 50 parts vinylpyridine and, per 100 parts of butadiene/vinylpyridine, from 5 to 30 parts styrene. Typically suitable terpolymers for use herein are also described in Mighton U.S. Pat. No. 2,561,215; Cislak et al. U.S. Pat. No. 2,402,020; and Wilson U.S. Pat. No. 2,652,353.

A styrene-butadiene copolymer latex may be used with the terpolymer latex. An example of such copolymer is one made up of a monomer ratio of from 50/50 to 70/30 parts of butadiene to styrene.

The methylene donor should be a 1-aza-3, 7-dioxabicyclo [3.3.0] octane of the formula

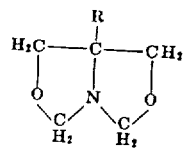

where R is an alkylol radical, preferably methylol. Suitable methods of preparing such compounds are shown in U.S. Pat. Nos. 3,366,970 and 3,281,311. The product "M-3," available from Uniroyal, is a particularly suitable methylene donor for use herein. This product is available in solid form (131° F. melting point) and is characterized by the fact that it is activated at temperatures around 248°–257° F. (120°–125° C.). Chemically, "M-3" is 1-aza-5-methylol-3, 7-dioxabicyclo [3.3.0] octane.

Partially reacted resorcinol-formaldehyde resins in aqueous solution or in water-soluble solid form are commercially available and any such prepolymers may be used herein. Particularly preferred is the resorcinol-formaldehyde prepolymer which is available in solid flake form under the name SRF-1500 (Schenectady Chemicals). This prepolymer is somewhat deficient in formaldehyde so that the prepolymer contains free — OH groups, the molar ratio of resorcinol to formaldehyde being about 1:1. Advantageously the prepolymer is dissolved in water containing a small amount of base, e.g., ammonium or sodium hydroxide, before mixing with the other components.

The preferred RFL composition of the invention may be prepared as follows:

Two aqueous solutions are first made up, one containing the methylene donor and the other the resorcinol-formaldehyde prepolymer. Typically, the first solution may contain, on a weight basis, 4–8 percent, preferably about 6 percent of the methylene donor, balance water, while the other solution contains 4–8 percent, e.g., about 6 percent of the resorcinol-formaldehyde prepolymer, 0.5–1.5 percent ammonium and/or sodium hydroxide or equivalent base, balance water.

The two solutions are then mixed with the latex and allowed to stand, advantageously for a few hours, e.g., 5–6 hours. The resulting composition is then ready for application to the glass fabric.

Glass fabric can be treated with RFL composition of the invention in any convenient fashion, e.g., by dipping, padding, spraying or the like after the warp and filling yarns have been bonded together at their cross-over points, preferably by heating on the loom to a temperature above the melting point of the thermoplastic and then cooling. After application of the RFL composition, the fabric should be dried usually by heating at 150°–325° F. for a period of about 1–5 minutes, depending on the temperature employed.

Drying at 160° F. for 5 minutes or at 200°–300° F. for 1–2.5 minutes is preferred, although optimum conditions will vary depending on the construction of the glass fabric and other factors.

After drying, the fabric is cured, e.g., by heating at 300°–500° F. for 1.5–3 minutes. A curing temperature of about 420°–425° F. for 2–2.5 minutes is generally preferred.

Dry solids add-on as a result of the RFL treatment will vary over a fairly wide range. However, a pick-up of 10–25 percent (dry solids) based on the original weight of the textile (including the thermoplastic yarn bonding material) is usually observed with 15–20 percent generally preferred.

The invention herein is useful with respect to glass tire fabrics of any conventional construction and glass composition, e.g., types K, G, DE, E, and beta. A typical tire fabric comprises a plain weave of 16 warp ends and 2–3 fill yarns per inch although, as indicated, other conventional tire fabric constructions may also be used. The fabric is processed herein in the greige state with starch or other processing sizes thereon although if desired the fabric may be cleaned before applications of the RFL composition.

The RFL coated glass fabric of the invention may be effectively bonded to any conventional tire rubber. This includes, for example, conventionally compounded natural rubber or such known synthetic rubbers or elastomers as neoprene, butyl nitriles (Buna N), styrene-butadiene (SBR), acrylonitrile-butadiene-styrene (ABS) and the like.

The invention is illustrated by the following example:

A greige tire fabric was woven in the plain weave using ECG-75's 1/5 glass yarns (16 warp ends and two ECG 150's 1/0 fill yarns per inch). The fill yarns had previously been given a vinyl coating by drawing the same through a solution of polyvinyl chloride followed by drying to leave a thin continuous film or coating of the vinyl resin on the fill yarns.

The fabric was woven using the vinyl-coated fill yarn and uncoated glass warp, the vinyl coating being fused on the loom and then cooled to bond the warp and fill yarns in position. Fusing of the coating was accomplished by two cal-rod units placed next to each other intermediate the ends of the loom. When weaving the vinyl-coated glass, the cal-rod units were placed about 1 inch from the fabric so that they heated about 10 inches of the fabric. The speed of the loom was about 1 inch per second and the fabric was heated for about 10 seconds at 450°–500° F. The loom was equipped with a bent shield to protect the fabric from further heating when the loom stopped. The heating was sufficient to fuse the vinyl coating and bond together the warp and fill yarns at their cross-over points. The fused vinyl was solidified by the time the fabric was removed from the loom thus providing a very stable fabric suitable for further processing.

The thus stabilized fabric was then coated with RFL composition. The latter was prepared as follows:

a. A solution was prepared by dissolving 6.15 parts of 1-aza-5-methylol-3, 7-dioxabicyclo [3.3.0] octane (M-3) in 93.85 parts of water.

b. A solution was also prepared by dissolving 6.15 parts resorcinol-formaldehyde prepolymer (SRF-1500) in 92.85 parts of water containing 1.00 parts of $NH_4OH$.

Solutions (a) and (b) were then mixed together with styrene-butadiene-vinylpyridine terpolymer latex and styrene-butadiene latex to give a final RFL composition of the following make up in parts by weight:

| | |
|---|---|
| terpolymer latex (41% solids) | 25 |
| styrene-butadiene latex (50% solids) | 25 |
| solution (a) | 17 |
| solution (b) | 33 |
| Total: | 100 |

This composition, after ageing at room temperature (25° C.) for 5–6 hours was applied to the greige fabric, as taken from the loom, by passing the fabric through the composition. This was followed by drying the fabric at 160° F. for 5 minutes and then curing at about 400° F. for 2–3 minutes. The fabric was then tested for its peel adhesion to rubber tire stock. Outstanding adhesions (75 lbs/inch or more) were obtained.

The above example was repeated except that the fill yarn was a plied continuous filament nylon/glass yarn and the fabric was heated on the loom at 550° F. for 30 seconds to stabilize the fabric. Subsequent application of RFL composition gave a tire fabric which was stable and showed good adhesion to rubber. Similar results were obtained using a rayon/glass/polyester plied yarn for the filling.

Various modifications may be made in the invention as described above. Hence the scope of the invention is defined in the following claims wherein:

We claim:

1. A tire fabric comprising glass warp and filling yarns, the glass filling yarns only being coated with thermoplastic and the warp and filling yarns being bonded together at cross-over points by fusion of the thermoplastic coating of said filling yarns to provide a thermoplastic resinous bond which essentially welds the cross-over points whereby slipping or sliding movement between the warp and filling yarns is precluded, the warp and filling yarns, including the thermoplastic bond, being treated with a tie coat composition for bonding to tire rubber, the tie coat composition comprising a synthetic rubber latex and resorcinol-formaldehyde reaction product.

2. The tire fabric of claim 1 wherein the tie coat comprises an aqueous mixture of a synthetic rubber latex, a methylene donor and a partially reacted resorcinolformaldehyde resin.

3. The tire fabric of claim 2 wherein the tie coat comprises a styrene-butadiene-vinylpyridine terpolymer, a 1-aza-3, 7-dioxabicyclo [3.3.0] octane and a partially reacted resorcinol-formaldehyde prepolymer which is deficient in formaldehyde.

4. The tire fabric of claim 3 wherein the methylene donor is 1-aza-5-methylol-3, 7-dioxabicyclo [3.3.0] octane.

5. A laminate comprising a tire rubber bonded to the fabric of claim 1.

6. A tire containing the fabric of claim 1.

7. The tire fabric of claim 1 wherein the filling yarns are vinyl-coated glass yarns, the vinyl coating being fused at the cross-over points to bond the warp yarns to the fill yarns at the cross-over points.

8. The tire fabric of claim 7 comprising 16 warp ends and two fill ends per inch.

* * * * *